United States Patent [19]

Tomita et al.

[11] Patent Number: 4,744,011
[45] Date of Patent: May 10, 1988

[54] AUTOMOBILE LAMP

[75] Inventors: Kenji Tomita; Kikuo Iguchi, both of Shizuoka; Yoshihiro Yamai, Aichi, all of Japan

[73] Assignees: Koito Manufacturing Co., Ltd., Tokyo; Toyota Jidosha Kabushiki Kaisha, Aichi, both of Japan

[21] Appl. No.: 854,980

[22] Filed: Apr. 23, 1986

[30] Foreign Application Priority Data

Apr. 27, 1985 [JP] Japan .............................. 60-64697[U]

[51] Int. Cl.⁴ ............................................... B60Q 1/00
[52] U.S. Cl. ..................... 362/80; 362/294; 362/267; 340/99
[58] Field of Search .................. 362/61, 80, 267, 294, 362/373; 340/99, 84, 87

[56] References Cited

FOREIGN PATENT DOCUMENTS

| 778859 | 5/1935 | France | 362/294 |
| 2525165 | 10/1983 | France | 362/61 |
| 479528 | 2/1938 | United Kingdom | 362/267 |
| 521524 | 5/1940 | United Kingdom | 362/294 |

Primary Examiner—William A. Cuchlinski
Assistant Examiner—D. M. Cox
Attorney, Agent, or Firm—Sughrue, Mion, Zinn, Macpeak & Seas

[57] ABSTRACT

An automobile lamp such as a license plate lamp having improved de-misting and waterproofing properties. The lamp includes a lamp housing, a lens, a gasket fitted between the housing and the lens, a member for conducting out the lead wires to the lamp socket, and a rubber cover crowning the lead conducting member and also serving as bushings for the leads. An air passageway communicates with the lamp chamber through the interiors of the bulb socket and the lead conducting member.

4 Claims, 2 Drawing Sheets

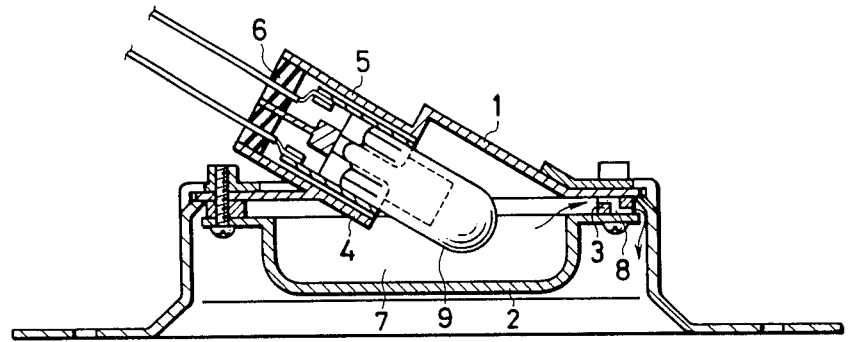
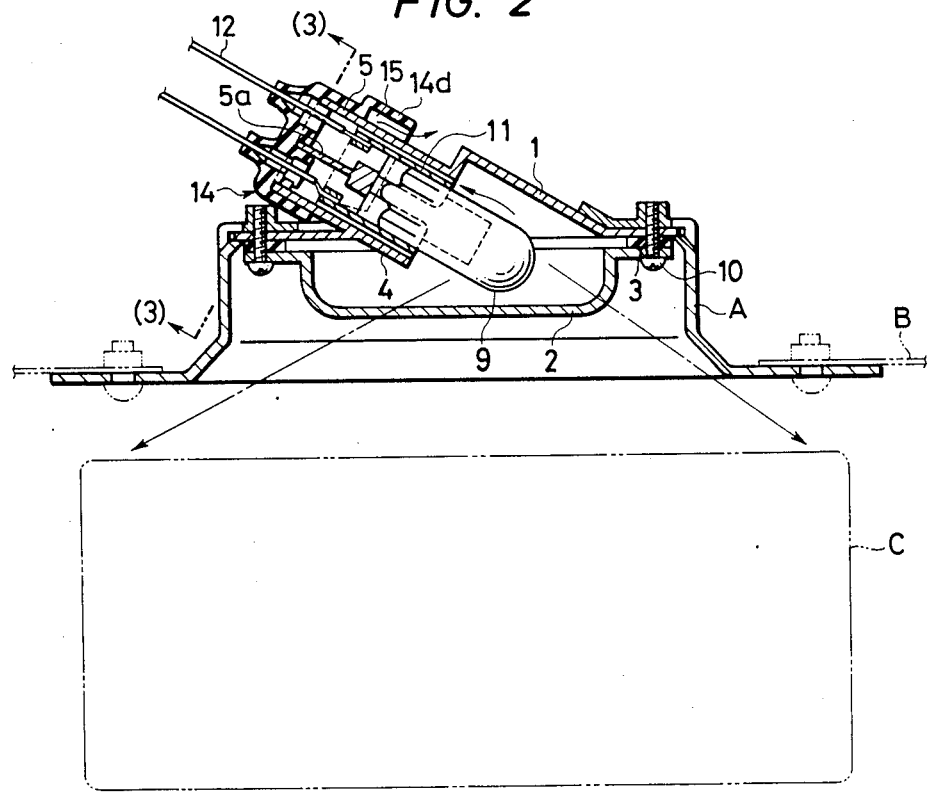

AUTOMOBILE LAMP

BACKGROUND OF THE INVENTION

The present invention relates to an automobile lamp such as a license plate lamp or tail lamp, and more particularly to improvements in the anti-misting and waterproofing of such a lamp.

As shown in FIG. 1, in a conventional automobile lamp of this type, the waterproofness of a lamp chamber 7 is ensured by fitting a gasket 3 between a lamp housing 1 and a lens 2 and by forcing bushing 6 into a member 5 through which pass the leads to the bulk socket 4. To prevent the inner surface of the lens 2 from misting, a vent 8 is formed in the gasket 3. However, such a construction is disadvantageous in that satisfactory waterproofing and anti-misting effects are sometimes unachievable because rain water can penetrate into the lamp chamber 7 through the vent 8 due to a so-called "respiratory" action caused by temperature changes resulting from the ON/OFF operation of the bulb 9 in the lamp chamber 7.

SUMMARY OF THE INVENTION

The present invention is intended to eliminate such shortcomings, and it is therefore an object of the present invention to provide an automobile lamp insuring complete anti-misting as well as waterproofness, and moreover which is readily mountable.

An automobile lamp constructed in accordance with the present invention and which accomplishes these and other objects comprises a lamp housing, a lens, a gasket fitted between the lamp housing and the lens, and means for conducting out the leads to the bulk socket and which is crowned with a rubber cover simultaneously used as a bushing for the leads, an air passageway being formed between the lead conducting means and the rubber cover, the air passageway communicating with a lamp chamber through the interiors of the bulb socket and the lead conducting means.

BRIEF DESCRIPTION OF THE DRAWINGS

FIG. 1 is a sectional view of a conventional automobile lamp;

FIG. 2 is a sectional view of a preferred embodiment of a lamp of the present invention;

DESCRIPTION OF THE PREFERRED EMBODIMENTS

Referring to drawings, a preferred embodiment of the present invention will be described.

Figure 3:
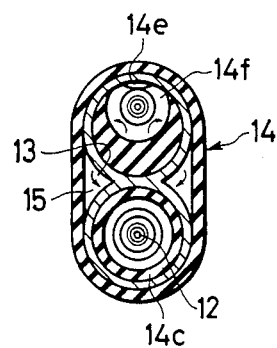
FIG. 3 is an enlarged sectional view taken on a line 2—2.
Figure 4:
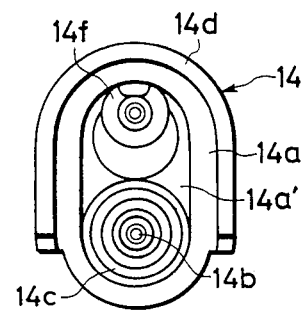
FIG. 4 is an elevational view of the rubber cover.
Figure 5:
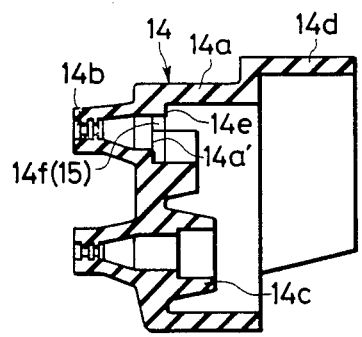
FIG. 5 is a sectional view of the rubber cover.

As shown in FIG. 2 to 5, an example of a license plate lamp of the invention includes, as in the case of a conventional lamp, a lamp housing 1, a lens 2, a gasket 3 fitted between the lamp housing 1 and the lens 2, a bulb socket 4, and a bulb 9 mounted on the bulb socket 4. The lamp housing 1, the lens 2, and the gasket 3 are fixed together with machine screws 10 in a watertight state to a bracket A, and thence to a vehicle body B through the bracket A. A license plate in the drawing is designated by C.

The bulb socket 4 may be formed integrally with the lamp housing 1, as shown in FIG. 2, or made detachable from the lamp housing 1. Moreover, the bulb 9 may be of the wedge base type (without a base) or of a type provided with a base. A member 5 for conducting out the leads 12 to the bulb socket 4 is incorporated with the bulb socket 4 in the form of a projection. The leads 12 are electrically connected to contacts 11 electrically in contact with the bulb 9.

The member 5 for conducting out leads is provided with a partition 5a therein to ensure the insulation of the two leads 12, and with a recess 13 on its outer side forming an air passageway 15 (described in more detail below), and it is crowned with a rubber cover 14 serving also a bushing for the leads 12.

The rubber cover 14 has a body 14a tightly in contact with the outer periphery of the member 5 to prevent water from penetrating the member 5, bushings 14b projecting outwardly from the bottom wall 14a' of the body and tightly fitted around the outer peripheries of the leads 12 to prevent water from penetrating therearound, guide members 14c projecting inwardly from the bottom wall 14a' of the body and inserted into the member 5, a skirt 14d having a diameter slightly larger than that of the body 14a so as to cover the exterior of the member 5 and thus prevent rain water from penetrating the member 5, and a stop 14e slightly inwardly projecting from the bottom wall 14a' of the body and contacting the end of the outlet of the member 5, a passageway 14f forming the air passageway 15 and prepared by cutting parts of the guides 14c and the stop 14e up to the bottom wall 14a' of the body 14.

When the member 5 is covered and crowned with the rubber cover 14, the air passageway 15 is formed between the member 5 and the rubber cover 14, whereby air in the lamp chamber 7 is allowed to pass freely in and out through the air passageway. In other words, the air passageway 15 is formed by the recess 13 of the member 5, the member 5 being covered with the body 14a of the rubber cover 14 and the skirt 14d, and the passageway 14f prepared by cutting parts of the guide 14c and the stop 14e. The air passageway 15 communicates with the lamp chamber 7 through the interiors of the bulb socket 4 and the member 5.

The cutout formed by cutting parts of the skirt 14d of the rubber cover 14 in the embodiment illustrated above is intended to prevent the skirt 14d from riding up because of the impediment of the lamp housing 1 when the member 5 is crowned with the rubber cover 14 after the bulb socket 4 is diagonally fitted in the lamp housing 1. It is therefore preferable to have the whole circumference enclosed like the body 14a, provided that the bulb socket 4 is attached perpendicularly relative to the lamp housing 1 with a sufficiently long member for conducting out socket leads.

The automobile lamp thus constructed according to the present invention ensures complete waterproofing on the lens side as a gasket is fitted between the lamp housing and the lens, and on the bulb socket side since the member for conducting out the bulb socket leads is covered and crowned with a rubber cover. Thus, complete waterproofing is attained.

Moreover, an air passageway is formed between the member for conducting out the leads to the socket and the rubber cover and communicated with the lamp chamber through the interiors of the bulb socket and the member for conducting out the leads to the socket, whereby the lamp chamber is allowed to communicate with the outside through the interiors of the bulb socket, member for conducting out the leads to the socket and the air passageway. In consequence, misting is suppressed on the inner surface of the lens because of the free "respiratory" action of the air within the lamp chamber and, in case some mist forms, de-misting will quickly occur.

The air passageway is formed between the member for conducting out the socket leads and the rubber cover without the need for making a vent in the gasket fitted between the lamp housing. Hence, rain water is prevented from penetrating the lamp chamber because of the "respiratory" action therein.

As the rubber cover also serves as a bushing for the leads to the lamp socket, it is unnecessary to provide a separate bushing for each lead, as in the case of conventional lamps, and hence one part and its accompanying assembly step can be dispensed with. Accordingly, a higher productivity is attained.

We claim:

1. An automobile lamp comprising: a lamp housing, a lens, a gasket fitted between said lamp housing and said lens, a bulb socket including means for conducting out bulb leads, a rubber cover crowning said bulb socket and also serving to form bushings for said leads, an air passageway being formed between said bulb socket and said rubber cover, said air passageway communicating with a lamp chamber through said bulb socket and said conducting means, said rubber cover comprising a body tightly in contact with the outer periphery of said bulb socket, first and second bushings projecting outwardly from a body wall of said body and tightly fitted around respective ones of said leads, at least one guide member projecting inwardly from a bottom wall of said body and inserted into said conducting member, a skirt having a diameter slightly larger than a diameter of said body and a stop projecting slightly inwardly from said bottom wall of said body and contacting an end of an outlet of said conducting member.

2. The automobile lamp of claim 1, wherein said air passageway is formed by cutting parts of said guide and said stop up to said bottom wall of said body.

3. An automobile lamp comprising: a lamp housing, a lens, a gasket fitted between said lamp housing and said lens, a bulb socket, a bulb mounted within said bulb socket, the improvement comprising a rubber cover having a body surrounding said bulb socket and including portions serving as first and second bushings projecting outwardly from said rubber cover body, said body being tightly in contact with the outer periphery of said bulb socket except for a portion thereof defining an air passageway formed between said rubber cover body and said bulb socket, said first and second bushings being tightly fitted around respective ones of said leads, a skirt having a diameter slightly larger than the diameter of said body and forming a space opening to said air passageway to prevent moisture entering said air passageway and communicating with the lamp chamber, said bulb socket including means for conducting out said bulb leads, said air passageway further communicating with said lamp chamber through a space between said bulb socket and said conducting out means, at least one guide member projecting inwardly from a bottom wall of said cover body, insertably into said conducting out means, a stop projecting slightly inwardly from the bottom wall of said body and contacting an end of an outlet of said conducting out means and wherein said air passageway is formed by cutting parts of said guide and said stop up to said bottom wall of said body.

4. The automobile lamp as claimed in claim 3, wherein said bulb socket has a transverse cross section which for a figure eight configuration of joined circular loops, and wherein said air passageway comprises spaces formed on opposite sides thereof and between said fixture eight shaped bulb socket and said rubber cover.

* * * * *